US012686059B2

(12) United States Patent
Harada et al.

(10) Patent No.: US 12,686,059 B2
(45) Date of Patent: Jul. 21, 2026

(54) CUTTING TOOL

(71) Applicant: Sumitomo Electric Industries, Ltd., Osaka (JP)

(72) Inventors: Masashi Harada, Osaka (JP); Hiromitsu Kuriyama, Osaka (JP); Tomoya Aoki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 378 days.

(21) Appl. No.: 18/288,575

(22) PCT Filed: Apr. 28, 2021

(86) PCT No.: PCT/JP2021/017101
§ 371 (c)(1),
(2) Date: Oct. 27, 2023

(87) PCT Pub. No.: WO2022/230149
PCT Pub. Date: Nov. 3, 2022

(65) Prior Publication Data
US 2024/0217003 A1      Jul. 4, 2024

(51) Int. Cl.
*B23B 27/16*        (2006.01)
*B23B 27/14*        (2006.01)
*B23B 29/12*        (2006.01)
*B23Q 17/09*        (2006.01)

(52) U.S. Cl.
CPC .......... *B23B 27/16* (2013.01); *B23B 2270/36* (2013.01)

(58) Field of Classification Search
CPC ..... B23B 27/16; B23B 27/14; B23B 2270/36; B23B 2260/024; B23B 2260/036; B23B 2260/128; B23B 29/12; B23Q 17/0966; B23Q 17/0985
See application file for complete search history.

(56) References Cited

U.S. PATENT DOCUMENTS

| | | | | |
|---|---|---|---|---|
| 9,751,180 B2 * | 9/2017 | Jayr | ...................... | G01L 5/1627 |
| 11,931,843 B2 * | 3/2024 | Imai | ........................ | B23B 25/06 |
| 12,411,471 B2 * | 9/2025 | Funaki | ................... | B23B 27/14 |

(Continued)

FOREIGN PATENT DOCUMENTS

| | | | | | |
|---|---|---|---|---|---|
| CN | 115666826 A | * | 1/2023 | ............. | B23B 27/14 |
| DE | 102007036002 A1 | * | 2/2009 | ............. | B23B 29/04 |

(Continued)

*Primary Examiner* — Bayan Salone
(74) *Attorney, Agent, or Firm* — XSENSUS LLP

(57) ABSTRACT

A cutting tool includes a body portion having a bar shape extending from a first end, which is an end on a side where a cutting tip for cutting the workpiece is placed, to a second end, which is an end opposite to the first end, and a sensor unit arranged on a surface of the body portion. The sensor unit includes a first sensor arranged on the surface of the body portion to detect a first physical quantity of the body portion, a board arranged on the surface of the body portion and electrically connected to the first sensor, a wireless communication unit mounted on the board and transmitting a signal containing information on the first physical quantity detected by first sensor to the outside, and a battery arranged in body portion and electrically connected to the board. The first sensor is closer to first end than battery.

12 Claims, 14 Drawing Sheets

(56) References Cited

U.S. PATENT DOCUMENTS

| 2010/0186560 A1 | * | 7/2010 | Tzschentke | B23Q 1/34 |
| | | | | 82/158 |
| 2016/0045994 A1 | | 2/2016 | Jayr et al. | |
| 2017/0252884 A1 | * | 9/2017 | Busi | B23Q 17/0971 |
| 2019/0299352 A1 | * | 10/2019 | Michiwaki | B23B 51/00 |
| 2019/0358709 A1 | * | 11/2019 | Chen | B23B 29/12 |
| 2021/0039219 A1 | | 2/2021 | Imai et al. | |
| 2022/0274183 A1 | * | 9/2022 | Hashimoto | B23Q 17/0985 |
| 2023/0205166 A1 | * | 6/2023 | Funaki | B23B 27/16 |
| | | | | 700/160 |

FOREIGN PATENT DOCUMENTS

| EP | 3292929 | A1 | * | 3/2018 | | B23B 25/06 |
| EP | 3292930 | A1 | * | 3/2018 | | B23B 25/06 |
| EP | 4163034 | A1 | * | 4/2023 | | B23B 27/16 |
| GB | 2577077 | A | * | 3/2020 | | B23B 27/145 |
| JP | 02076605 | A | * | 3/1990 | | |
| JP | H02-076605 | A | | 3/1990 | | |
| JP | 103-294150 | A | | 12/1991 | | |
| JP | 03294150 | A | * | 12/1991 | | |
| JP | 2007030138 | A | * | 2/2007 | | |
| JP | 2009285804 | A | * | 12/2009 | | |
| JP | 2012020359 | A | * | 2/2012 | | |
| JP | 2018054612 | A | * | 4/2018 | | |
| JP | 2019130635 | A | * | 8/2019 | | G01B 11/2408 |
| JP | 2019166600 | A | * | 10/2019 | | |
| JP | 2019209420 | A | * | 12/2019 | | |
| JP | 2020062746 | A | * | 4/2020 | | B23Q 17/09 |
| JP | 2020089924 | A | * | 6/2020 | | |
| JP | 2020104257 | A | * | 7/2020 | | B23Q 17/09 |
| JP | WO2020171156 | A1 | * | 12/2021 | | B23B 51/00 |
| WO | WO-2007088197 | A1 | * | 8/2007 | | B23C 5/003 |
| WO | WO-2014154593 | A1 | * | 10/2014 | | G01B 7/18 |
| WO | WO-2016202569 | A1 | * | 12/2016 | | G01N 3/58 |
| WO | WO-2018047834 | A1 | * | 3/2018 | | B23Q 17/09 |
| WO | WO-2020070907 | A1 | * | 4/2020 | | B23Q 17/09 |
| WO | WO-2020171156 | A1 | * | 8/2020 | | B23B 51/00 |

* cited by examiner

CUTTING TOOL

CROSS-REFERENCE TO RELATED APPLICATION

The present application is based on PCT/JP2021/017101, filed Apr. 28, 2021, the entire contents of which are incorporated herein by reference.

TECHNICAL FIELD

The present disclosure relates to a cutting tool.

BACKGROUND ART

Techniques for monitoring the state of a cutting tool by measuring a physical quantity, e.g. strain, of the cutting tool with a sensor during machining with the cutting tool are known (see, for example, Japanese Patent Application Laid-Open No. 2020-62746 (Patent Literature 1), European Patent Application Publication No. 3292929 (Patent Literature 2), European Patent Application Publication No. 3292930 (Patent Literature 3), Japanese Patent Application Laid-Open No. 2019-166600 (Patent Literature 4), International Publication No. WO 2014/154593 (Patent Literature 5), Japanese Patent Application Laid-Open No. 2007-30138 (Patent Literature 6), International Publication No. WO 2007/088197 (Patent Literature 7), Japanese Patent Application Laid-Open No. H3-294150 (Patent Literature 8), Japanese Patent Application Laid-Open No. 2012-20359 (Patent Literature 9), Japanese Patent Application Laid-Open No. 2019-130635 (Patent Literature 10), Japanese Patent Application Laid-Open No. 2019-209420 (Patent Literature 11), Japanese Patent Application Laid-Open No. 2018-54612 (Patent Literature 12), International Publication No. WO 2016/202569 (Patent Literature 13), Japanese Patent Application Laid-Open No. 2009-285804 (Patent Literature 14), and International Publication No. WO 2018/047834 (Patent Literature 15)).

CITATION LIST

Patent Literature

Patent Literature 1: Japanese Patent Application Laid-Open No. 2020-62746

Patent Literature 2: European Patent Application Publication No. 3292929

Patent Literature 3: European Patent Application Publication No. 3292930

Patent Literature 4: Japanese Patent Application Laid-Open No. 2019-166600

Patent Literature 5: International Publication No. WO 2014/154593

Patent Literature 6: Japanese Patent Application Laid-Open No. 2007-30138

Patent Literature 7: International Publication No. WO 2007/088197

Patent Literature 8: Japanese Patent Application Laid-Open No. H3-294150

Patent Literature 9: Japanese Patent Application Laid-Open No. 2012-20359

Patent Literature 10: Japanese Patent Application Laid-Open No. 2019-130635

Patent Literature 11: Japanese Patent Application Laid-Open No. 2019-209420

Patent Literature 12: Japanese Patent Application Laid-Open No. 2018-54612

Patent Literature 13: International Publication No. WO 2016/202569

Patent Literature 14: Japanese Patent Application Laid-Open No. 2009-285804

Patent Literature 15: International Publication No. WO 2018/047834

SUMMARY OF INVENTION

A cutting tool according to the present disclosure is a cutting tool for cutting a workpiece by contacting the workpiece that is rotating. The cutting tool includes: a body portion having a bar shape extending from a first end, which is an end on a side where a cutting tip for cutting the workpiece is placed, to a second end, which is an end opposite to the first end; and a sensor unit arranged on a surface of the body portion. The sensor unit includes a first sensor arranged on the surface of the body portion to detect a first physical quantity of the body portion, a board arranged on the surface of the body portion and electrically connected to the first sensor, a wireless communication unit mounted on the board and transmitting a signal containing information on the first physical quantity detected by the first sensor to an outside, and a battery arranged in the body portion and electrically connected to the board. The first sensor is arranged closer to the first end than the battery.

DESCRIPTION OF EMBODIMENTS

Figure 1:
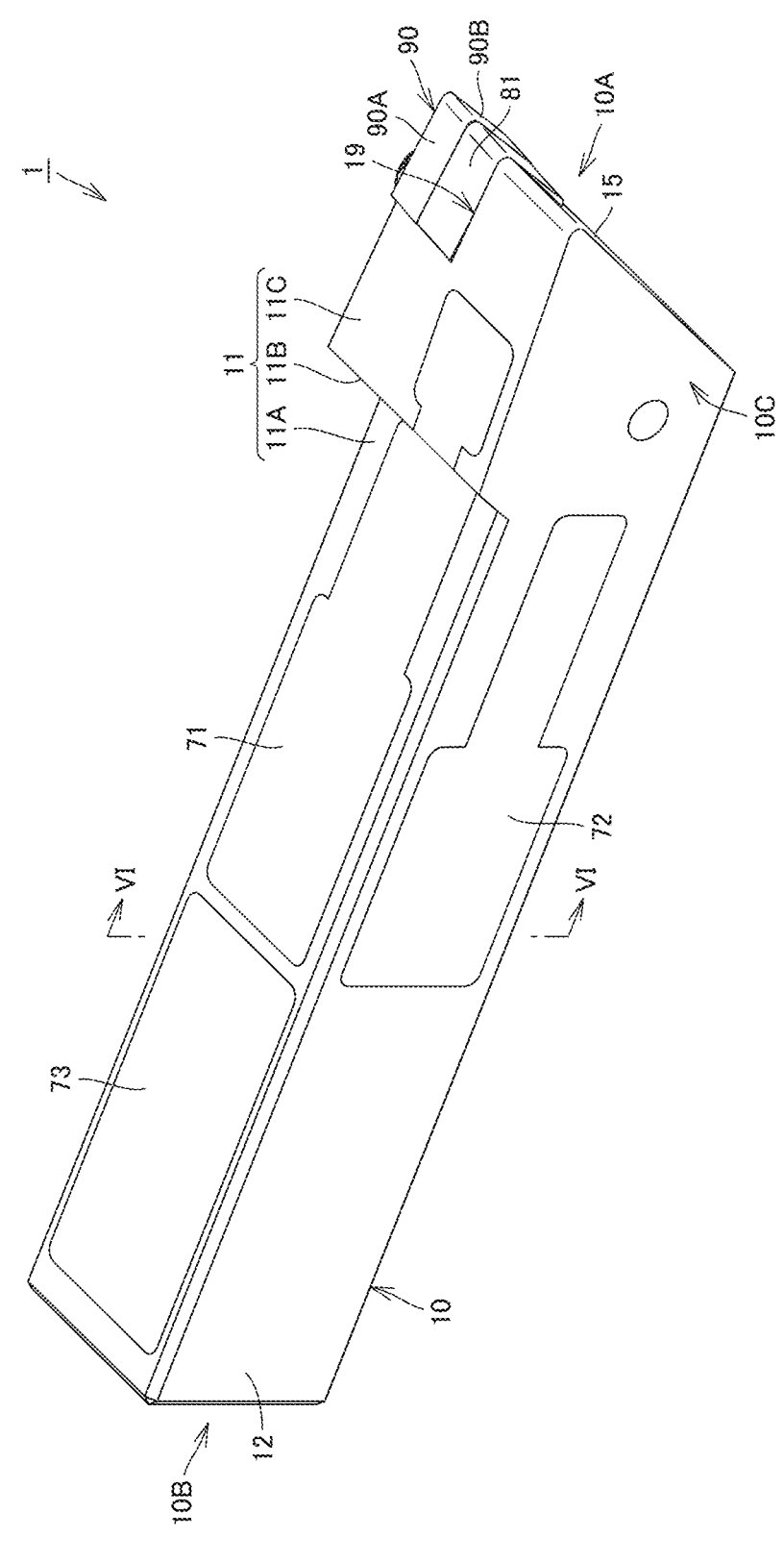
FIG. 1 is a schematic perspective view showing the structure of a cutting tool.

Problems to be Solved by Present Disclosure

In order to monitor the state of the cutting tool during machining, a structure can be adopted in which a sensor that detects a specific physical quantity is disposed in a body portion of the cutting tool and information on the physical quantity detected by the sensor is transmitted to the outside by a wireless communication unit. A battery that supplies power to the sensor and the wireless communication unit can also be arranged in the body portion. However, adopting such a structure may lead to insufficient sensitivity of the sensor during machining and insufficient rigidity of the cutting tool. One of the objects of the present disclosure is to achieve both the sensitivity of the sensor and the rigidity of the cutting tool while enabling monitoring of the state of the cutting tool during machining.

Advantageous Effects of Present Disclosure

The cutting tool of the present disclosure is able to achieve both the sensitivity of the sensor and the rigidity of the cutting tool while enabling monitoring of the state of the cutting tool during machining.

Description of Embodiments of Present Disclosure

Embodiments of the present disclosure will be first listed and described. The cutting tool of the present disclosure is a cutting tool for cutting a workpiece by contacting the workpiece that is rotating. The cutting tool includes: a body portion having a bar shape extending from a first end, which is an end on a side where a cutting tip for cutting the workpiece is placed, to a second end, which is an end opposite to the first end; and a sensor unit arranged on a surface of the body portion. The sensor unit includes a first sensor arranged on the surface of the body portion to detect a first physical quantity of the body portion, a board arranged on the surface of the body portion and electrically connected to the first sensor, a wireless communication unit mounted on the board and transmitting a signal containing information on the first physical quantity detected by the first sensor to an outside, and a battery arranged in the body portion and electrically connected to the board. The first sensor is arranged closer to the first end than the battery.

In the cutting tool of the present disclosure, the first physical quantity detected by the first sensor is transmitted to the outside by the wireless communication unit. This enables monitoring of the state of the cutting tool during machining. The first sensor is arranged closer to the first end than the battery. Placing the first sensor closer to the first end, which is the end on the side where the cutting tip is disposed, leads to increased sensitivity in the detection of the first physical quantity by the first sensor. In order to place the battery in the body portion, it is necessary to form a space for housing the battery inside the body portion. This results in decreased rigidity of the body portion in the region where the battery is placed. On the other hand, the second end side of the cutting tool is often held by a chuck mechanism of a machine tool. Therefore, placing the battery closer to the second end than the first sensor can suppress the effect of the rigidity reduction of the cutting tool. Thus, the cutting tool of the present disclosure can achieve both the sensitivity of the sensor and the rigidity of the cutting tool while enabling monitoring of the state of the cutting tool during machining.

In the above cutting tool, as viewed from the board, the first sensor may be arranged on the first end side and the battery may be arranged on the second end side. Arranging the first sensor and the battery with the board therebetween in this manner facilitates achievement of the structure of the sensor unit of the present disclosure described above.

In the above cutting tool, the sensor unit may further include a second sensor that is arranged on the surface of the body portion to detect a second physical quantity of the body portion. This configuration enables the sensor unit to detect a plurality of physical quantities.

In the above cutting tool, the first physical quantity may be strain. The second physical quantity may be at least one of acceleration and temperature. This configuration enables the sensor unit to detect strain and at least one of acceleration and temperature. The sensor unit may further include second sensor wiring that connects the second sensor to the board. The wireless communication unit may transmit a signal containing the information on the second physical quantity detected by the second sensor to the outside.

In the above cutting tool, the second sensor may be arranged closer to the first end than the first sensor.

Acceleration and temperature can be detected with accuracy when they are detected at a position close to the cutting tip. On the other hand, strain can be detected with accuracy when it is detected at a position where the moment of the body portion due to machining is large, i.e., at a position at a certain distance from the cutting tip. Placing the second sensor for detecting at least one of acceleration and temperature closer to the first end, which is the end on the side where the cutting tip is placed, than the first sensor for detecting strain enables detection of the strain as well as at least one of the acceleration and temperature with accuracy.

In the above cutting tool, the sensor unit may further include an AD converter that is arranged on the board and converts an analog signal containing the information on the first physical quantity detected by the first sensor into a digital signal for transmission to the wireless communication unit. With this configuration, the signal containing the information on the first physical quantity can be converted into a signal that can be transmitted from the wireless communication unit.

The analog signal containing the information on the first physical quantity detected by the first sensor is conveyed to a first area, which is a region of the board to which first sensor wiring is connected, and then converted into a digital signal in the AD converter and conveyed to the wireless communication unit, and the digital signal is transmitted to the outside from the wireless communication unit. Therefore, placing the first area, the AD converter, and the wireless communication unit in this order from the first end side to the second end side in the longitudinal direction of the body portion can decrease the length of the wiring pattern on the board. As a result, the board can be reduced in size.

In the above cutting tool, the body portion may have a quadrangular shape in a cross section perpendicular to the longitudinal direction. A first recess may be formed in a first surface, which is an outer peripheral surface of the body portion corresponding to one of the four sides of the quadrangle. The board and the wireless communication unit may be arranged in the first recess. The first surface may be a surface, among the outer peripheral surfaces of the body portion corresponding to the respective sides of the quadrangle, corresponding to a side flank of the cutting tip.

A cutting tool having a body portion that has a cross section of quadrangular shape perpendicular to the longitudinal direction is often held in a manner in which it is in contact with a chuck mechanism of a machine tool on three of the four outer peripheral surfaces of the body portion corresponding to the respective sides of the quadrangle, except for the surface corresponding to the side flank of the cutting tip. Therefore, placing the board and the wireless communication unit in the first recess formed in the first surface, which is the surface corresponding to the side flank of the cutting tip, allows the signals originated from the wireless communication unit to be transmitted to the outside without being interrupted by the chuck mechanism.

In the above cutting tool, a space in the body portion housing the battery may be open at the first surface. This configuration facilitates replacement of the battery in the state where the cutting tool is secured to the chuck mechanism of the machine tool.

The above cutting tool may further include a lid covering the first recess. This configuration enables protection of the board and the wireless communication unit in the first recess. The above lid may be at least partially made of resin, rubber, or ceramic. This configuration allows the lid to protect the board and the wireless communication unit in the first recess, without interrupting signals originated from the wireless communication unit.

In the above cutting tool, the sensor unit may further include battery wiring connecting the battery to the board, and first sensor wiring connecting the first sensor to the board. The first area, which is a region of the board to which the first sensor wiring is connected, may be located closer to the first end than a second area, which is a region of the board to which the battery wiring is connected. Connecting the first sensor wiring and the battery wiring to the board in this manner facilitates achievement of the structure of the sensor unit of the present disclosure described above.

DETAILS OF EMBODIMENTS OF PRESENT INVENTION

Embodiments of the cutting tool according to the present disclosure will be described below with reference to the drawings. In the drawings referenced below, the same or corresponding portions are denoted by the same reference numerals and the description thereof will not be repeated.

Embodiment 1

(1) Structure of Body Portion

Figure 2:
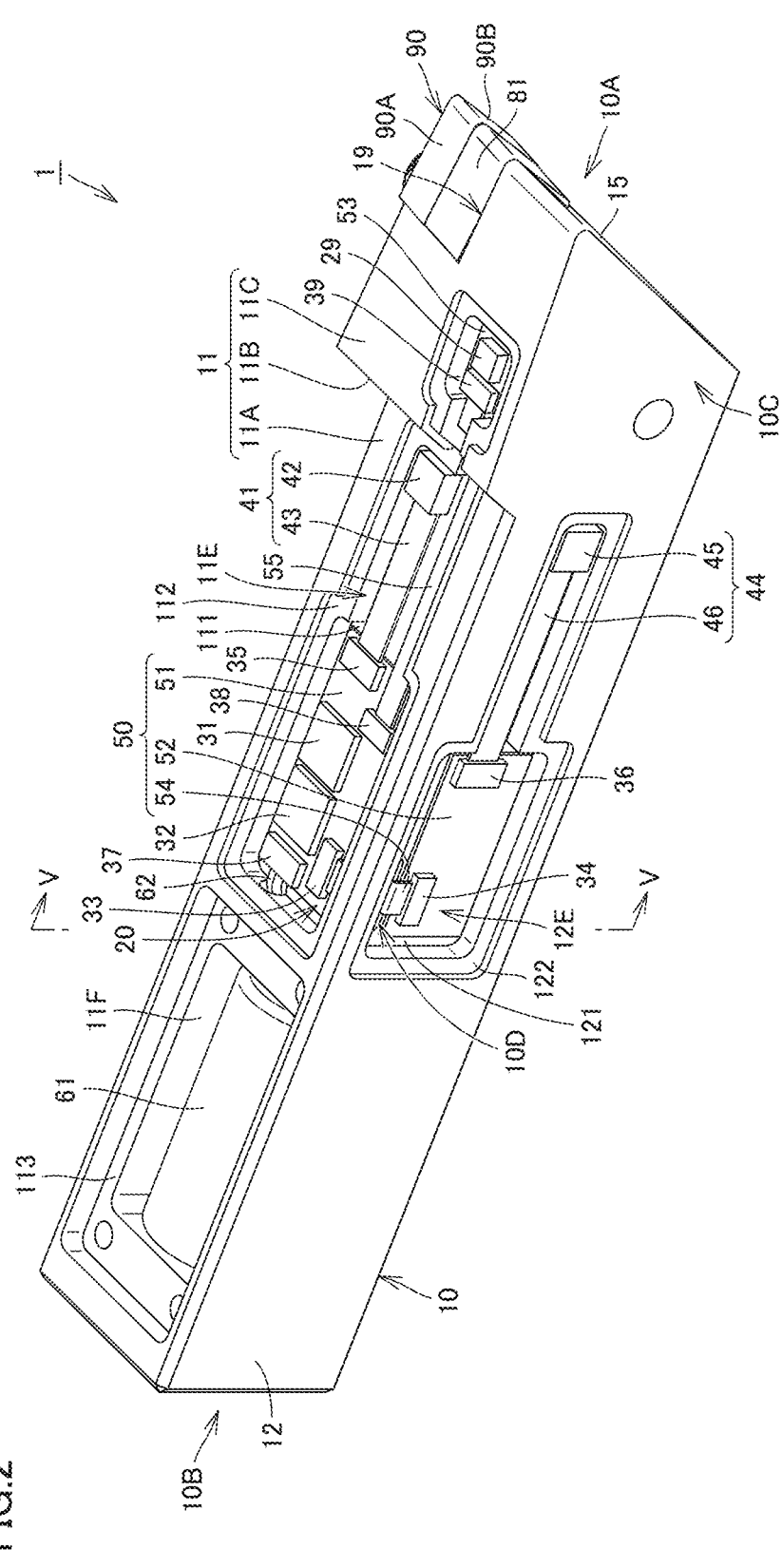
FIG. 2 is a schematic perspective view showing the structure of the cutting tool with lids removed therefrom.
Figures 3, 4:
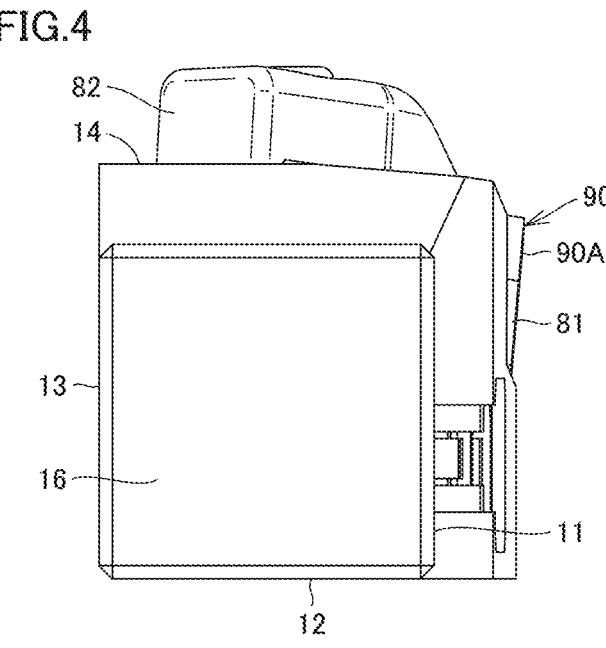
FIG. 3 is a schematic plan view showing the structure of the cutting tool as viewed from a first end side.
FIG. 4 is a schematic plan view showing the structure of the cutting tool as viewed from a second end side.
Figure 5:
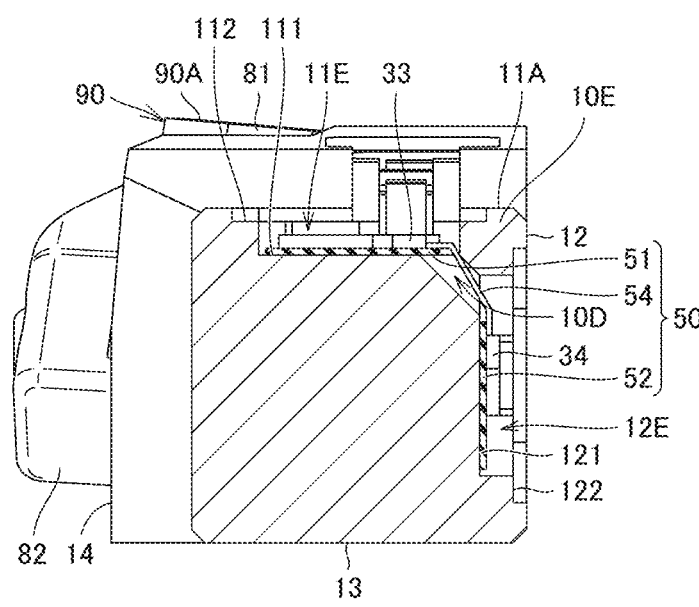
FIG. 5 is a schematic cross-sectional view along the line V-V in FIG. 2.
Figure 6:
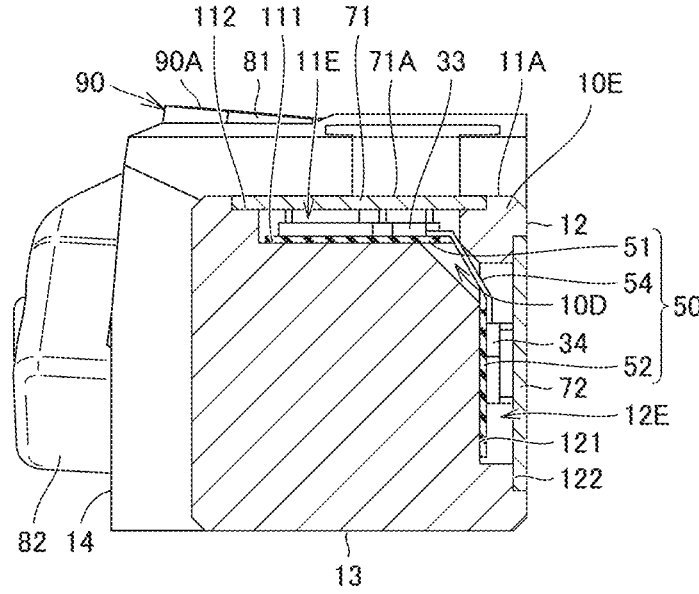
FIG. 6 is a schematic cross-sectional view along the line VI-VI in FIG. 1.

FIG. 1 is a schematic perspective view showing the structure of a cutting tool. FIG. 2 is a schematic perspective view showing the structure of the cutting tool with lids removed therefrom. FIG. 3 is a schematic plan view showing the structure of the cutting tool as viewed from a first end side. FIG. 4 is a schematic plan view showing the structure of the cutting tool as viewed from a second end side. FIG. 5 is a schematic cross-sectional view along the line V-V in FIG. 2. FIG. 6 is a schematic cross-sectional view along the line VI-VI in FIG. 1.

Referring to FIGS. 1 to 4, the cutting tool 1 of the present embodiment includes a bar-shaped body portion 10 that extends from a first end 10A to a second end 10B. Although the shape of the body portion of the present disclosure is not particularly limited, the body portion 10 of the present embodiment has a rectangular parallelepiped shape, for example. The surface of the body portion 10 includes a first surface 11, a second surface 12, a third surface 13, a fourth surface 14, a fifth surface 15, and a sixth surface 16. The first surface 11 includes a first region 11A, a third region 11C that is arranged on the first end 10A side of the first region 11A, and a second region 11B that is a stepped portion connecting the first region 11A to the third region 11C. On the first end 10A of the body portion 10, a holding portion 19 is formed, which is a recess for holding a cutting tip 90. The holding portion 19 is open at the third region 11C of the first surface 11, the fourth surface 14, and the fifth surface 15. In the holding portion 19, the cutting tip 90 and a soleplate 81 are arranged. The cutting tip 90 is disposed on top of the soleplate 81.

The body portion 10 has a quadrangular shape in a cross section perpendicular to the longitudinal direction. The first surface 11, the second surface 12, the third surface 13, and the fourth surface 14, which are the outer peripheral surfaces of the body portion, correspond respectively to the four sides of the quadrangle. The cutting tip 90 includes a side flank 90A and a front flank 90B. The first surface 11 is a surface, among the outer peripheral surfaces of the body portion corresponding to the respective sides of the quadrangle, that corresponds to the side flank 90A of the cutting tip 90.

Arranged on the fourth surface 14 near the first end 10A is a securing portion 82 for securing the cutting tip 90. The cutting tip 90 is held while being sandwiched between the soleplate 81 and the securing portion 82. The cutting tip 90 is detachably secured by the pivotable securing portion 82. The cutting tool 1 is a cutting tool that cuts a workpiece as the cutting tip 90 comes into contact with the rotating workpiece. In other words, the cutting tool 1 is a cutting tool used for turning machining.

Referring to FIG. 2, the first surface 11 of the body portion 10 has a first recess 11E formed across the first region 11A, the second region 11B, and the third region 11C. The second surface 12 has a second recess 12E formed therein. In the first region 11A of the first surface 11, a battery housing portion 11F, which is a space for housing a battery 61, is formed on the second end 10B side as viewed from the first recess 11E. The battery 61 is housed in the battery housing portion 11F. The battery housing portion 11F is open at the first surface 11.

(2) Structure of Sensor Unit

As shown in FIG. 2, the first recess 11E has a first board 51 arranged therein. The first board 51 is arranged in the first recess 11E located in the first region 11A. The second recess 12E has a second board 52 arranged therein. In the first recess 11E located in the third region 11C, a third board 53 is arranged. The first board 51, the second board 52, and the third board 53 each include a board body made of an insulator such as resin, and a circuit pattern (not shown) made of an electrical conductor such as copper formed on a surface of the board body. Referring to FIGS. 2 and 5, the first recess 11E and the second recess 12E are connected via a first through hole 10D. In the body portion 10, the first through hole 10D is formed to connect the first surface 11 to the second surface 12. As a result, in the longitudinal direction of the body portion 10 (direction connecting between the first end 10A and the second end 10B), the body portion 10 includes a columnar portion 10E that connects between both sides of the first through hole 10D so as to include the first surface 11 and the second surface 12.

Referring to FIGS. 2 and 5, the first board 51 and the second board 52 are electrically connected via a flexible cable 54. The first board 51, the second board 52, and the flexible cable 54 constitute a board module 50. The first board 51 is a first portion of the board module 50. The second board 52 is a second portion of the board module 50. The flexible cable 54 is a connecting portion of the board module 50. For the connecting portion, a flexible board may be adopted instead of the flexible cable 54. The flexible cable 54 passes through the first through hole 10D to electrically connect the first board 51 to the second board 52. For the connecting portion, a cable or a board other than the flexible cable and the flexible board may be adopted.

Referring to FIG. 2, the first surface 11 has a first strain sensor 42 arranged thereon. The first strain sensor 42 is arranged in the first recess 11E located in the first region 11A of the first surface 11. The second surface 12 has a second strain sensor 45 arranged thereon. The second strain sensor 45 is arranged in the second recess 12E of the second surface 12. Arranged in the third region 11C of the first surface 11 is an acceleration sensor 29, which is a second sensor. The acceleration sensor 29 is arranged in the first recess 11E located in the third region 11C. The first strain sensor 42 and the second strain sensor 45, which are first sensors, detect strain as a first physical quantity of the body portion 10. The acceleration sensor 29 as the second sensor detects acceleration as a second physical quantity of the body portion 10. The acceleration sensor 29 is arranged closer to the first end 10A than the first strain sensor 42 and the second strain sensor 45. In place of, or in addition to, the acceleration sensor 29, a temperature sensor may be arranged in the third region 11C (on the third board 53 in the recess 11E). The temperature sensor is arranged closer to the first end 10A than the first strain sensor 42 and the second strain sensor 45.

The first strain sensor 42 has wiring 43 as first wiring (first sensor wiring) connected thereto. The first strain sensor 42 and the wiring 43 constitute a first strain sensor component 41. The second strain sensor 45 has wiring 46 as second wiring connected thereto. The second strain sensor 45 and the wiring 46 constitute a second strain sensor component 44.

On the first board 51 (on the circuit pattern of the first board 51), an AD converter 31, a wireless communication unit 32, a connector 33, a connector 35, a connector 37, and a connector 38 are mounted. The connector 35, the connector 38, the AD converter 31, the wireless communication unit 32, the connector 33, and the connector 37 are arranged in this order in the direction from the first end 10A to the second end 10B. On the second board 52 (on the circuit pattern of the second board 52), a connector 36 and a connector 34 are mounted. The connector 36 and the connector 34 are arranged in this order in the direction from the first end 10A to the second end 10B.

The wiring 46 is connected to the connector 36. With this, the second strain sensor 45 is electrically connected to the second board 52. The connector 34 and the connector 33 are connected via the flexible cable 54. With this, the second board 52 and the first board 51 are electrically connected to each other. The wiring 43 is connected to the connector 35. With this, the first strain sensor 42 is electrically connected to the first board 51. A connector 39 and the connector 38 are connected via wiring 55. With this, the third board 53 and the first board 51 are electrically connected to each other. The wiring 55 as second sensor wiring electrically connects the acceleration sensor 29 to the first board 51. The connector 37 and the battery 61 are connected via wiring 62 (battery wiring). With this, the battery 61 is electrically connected to the first board 51. The battery 61 supplies power to the AD converter 31, the wireless communication unit 32, the first strain sensor 42, the second strain sensor 45, and the acceleration sensor 29.

The first strain sensor 42, the second strain sensor 45, and the acceleration sensor 29 are arranged closer to the first end 10A than the battery 61. As viewed from the first board 51, the first strain sensor 42, the second strain sensor 45, and the acceleration sensor 29 are arranged on the first end 10A side, and the battery 61 is arranged on the second end 10B side. A first area (a region where the connector 35 is arranged), which is a region of the first board 51 to which the wiring 43 as the first sensor wiring (wiring connecting the first strain sensor 42 to the first board 51) is connected, is located closer to the first end 10A than a second area (a region where the connector 37 is arranged), which is a region of the first board 51 to which the wiring 62 as the battery wiring is connected. The first to third boards 51, 52, 53 arranged on the surface of the body portion 10 as well as the AD converter 31, the wireless communication unit 32, and the connectors 33 to 39 mounted on the boards, and the first strain sensor component 41, the second strain sensor component 44, the acceleration sensor 29, and the wiring 55 constitute a sensor unit 20. It should be noted that while the case where a battery is adopted as the power supply source has been described in the present embodiment, the power supply source for the cutting tool of the present disclosure is not limited to the battery. The power supply source may be, for example, a battery built in the body portion as in the present embodiment, a power supply module prepared separately from, and connected to, the cutting tool, or may be both of them.

(3) Placement State of Lids

Referring to FIGS. 1 and 2, the cutting tool 1 includes a first lid 71, a second lid 72, and a third lid 73. The first lid 71 covers the first recess 11E. The second lid 72 covers the second recess 12E. The third lid 73 covers the battery housing portion 11F. The first lid 71 may be entirely made of resin, rubber, or ceramic, or may be partially made of resin, rubber, or ceramic. In the case where the lid is partially made of resin, rubber, or ceramic, the remaining part of the first lid 71 may be made of metal. The second lid 72 and the third lid 73 may be entirely made of resin, rubber, or ceramic, or may be entirely made of metal. The second lid 72 and the third lid 73 may be partially made of resin, rubber, or ceramic, and the remaining parts may be made of metal. Referring to FIGS. 2 and 6, the body portion 10 includes a first bottom wall 111 and a second bottom wall 112. The first bottom wall 111 and the second bottom wall 112 constitute a wall surface defining the first recess 11E. The second bottom wall 112 has a smaller distance from an opening of the first recess 11E than the first bottom wall 111. As viewed in a depth direction of the first recess 11E, the second bottom wall 112 surrounds the first bottom wall 111. The first strain sensor 42 and the first board 51 are arranged on the first bottom wall 111. The first lid 71 is arranged on the second bottom wall 112 and is received within the first recess 11E. The first lid 71 may be bonded to the body portion 10.

The body portion 10 includes a third bottom wall 121 and a fourth bottom wall 122. The third bottom wall 121 and the fourth bottom wall 122 constitute a wall surface defining the second recess 12E. The fourth bottom wall 122 has a smaller distance from an opening of the second recess 12E than the third bottom wall 121. As viewed in a depth direction of the second recess 12E, the fourth bottom wall 122 surrounds the third bottom wall 121. The second strain sensor 45 and the second board 52 are arranged on the third bottom wall 121. The second lid 72 is arranged on the fourth bottom wall 122 and is received within the second recess 12E. The second lid 72 may be bonded to the body portion 10.

Referring to FIGS. 2 and 1, in plan view in the depth direction of the battery housing portion 11F, the body portion 10 includes an annular fifth bottom wall 113 along the outer edge of the battery housing portion 11F. The third lid 73 is arranged on the fifth bottom wall 113 and is received within the battery housing portion 11F. The third lid 73 may be secured to the body portion 10 with screws, magnets, or the like.

(4) Operation of Cutting Tool

Referring to FIGS. 1 and 2, in operation of the cutting tool 1, the cutting tool 1 contacts a rotating workpiece at the cutting tip 90 to machine the workpiece. At this time, the strain of the body portion 10 is detected by the first strain sensor 42 and the second strain sensor 45. Further, the acceleration of the body portion 10 is detected by the acceleration sensor 29. Signals containing information on the strain and the acceleration detected by the strain sensors 42, 45 and the acceleration sensor 29 are analog signals. The information on the strain and the acceleration as the analog signals is converted into digital signals in the AD converter 31, and then transmitted to the wireless communication unit 32 for transmission to the outside by the wireless communication unit 32. Here, as the first lid 71 is entirely or partially made of resin, rubber, or ceramic, the wireless communication unit 32 can transmit the signals to the outside through the first lid 71. The signals are received and analyzed at the outside, whereby the state of the body portion 10 is monitored.

Figure 7:
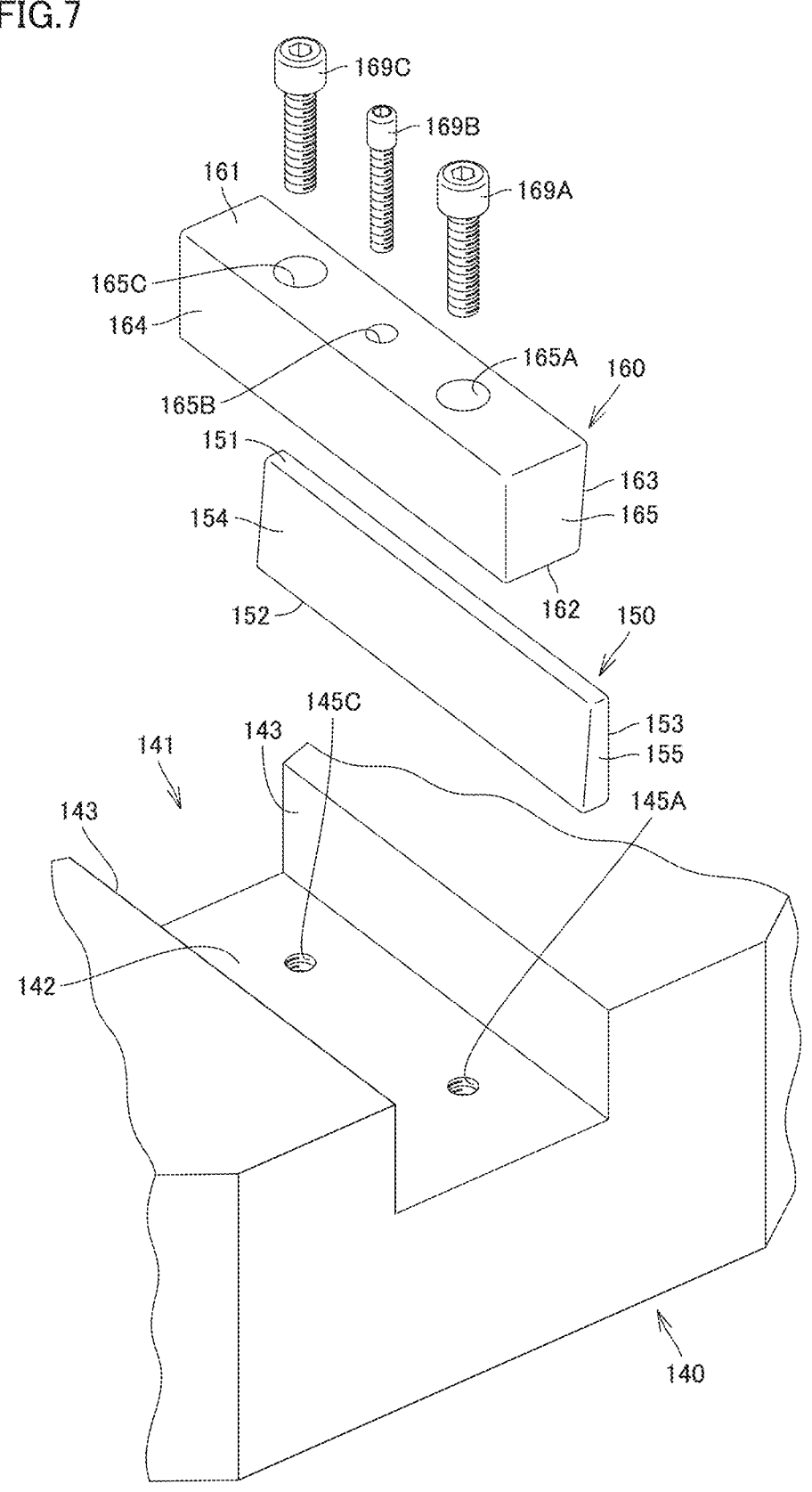
FIG. 7 is a schematic perspective view showing the structure of a turret.
Figure 8:
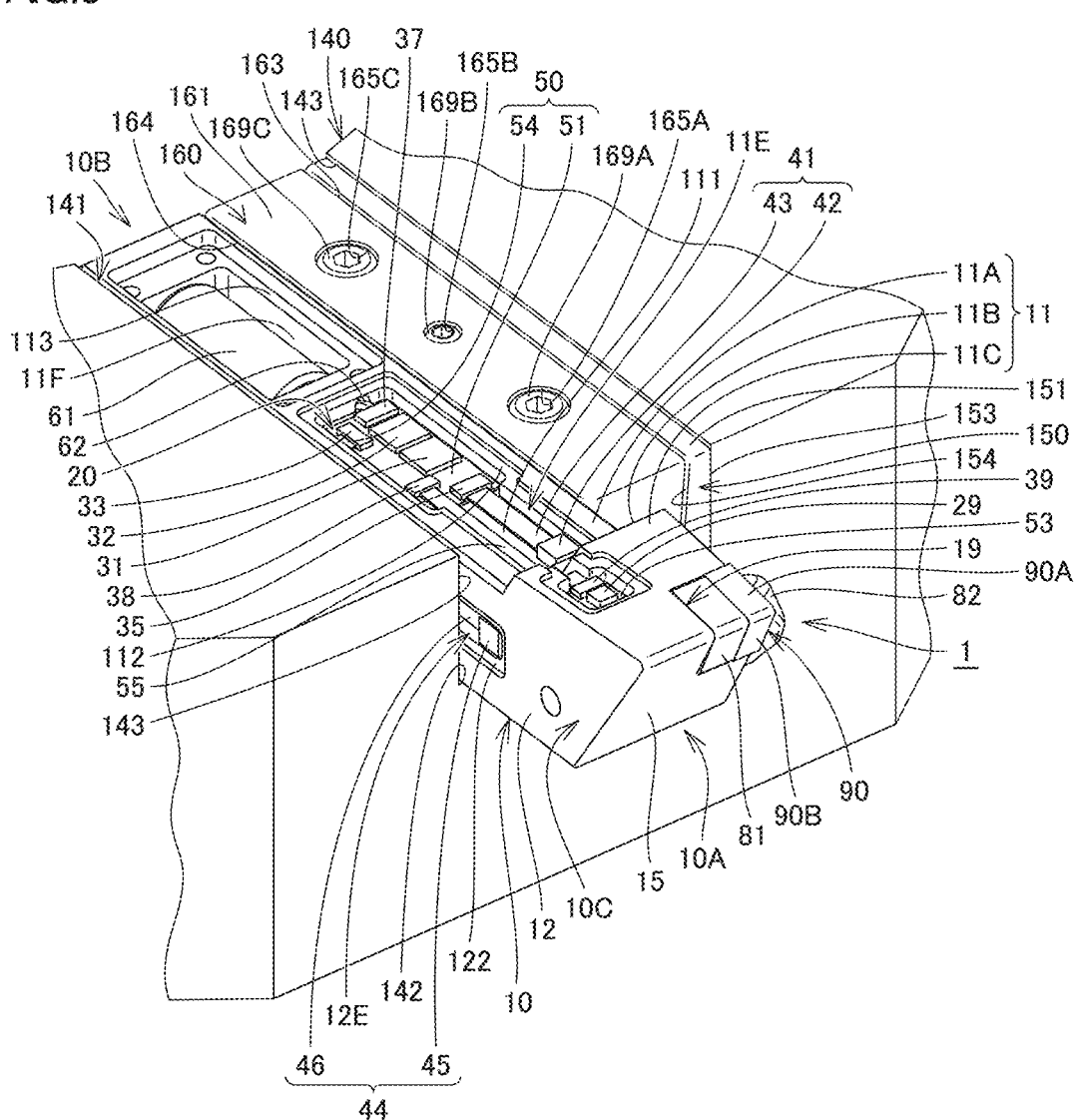
FIG. 8 is a schematic perspective view showing the state where the cutting tool is held in the turret.

The cutting tool 1 can be secured to a machine tool in various ways for use. The cutting tool 1 is secured to, for example, a chuck mechanism of the machine tool in the following manner. FIG. 7 is a schematic perspective view showing the structure of a turret. FIG. 8 is a schematic perspective view showing the state where the cutting tool is held in the turret. While the cutting tool 1 is held in the turret in the state where the first lid 71, the second lid 72, and the third lid 73 are attached thereto, FIG. 8 illustrates the state where the first lid 71, the second lid 72, and the third lid 73 are removed therefrom for ease of explanation. Referring to FIG. 7, the turret 140, which is the chuck mechanism included in the machine tool (not shown), has a groove 141 formed for holding the cutting tool 1. The groove 141 is defined by a bottom wall 142 and a pair of side walls 143 rising from the bottom wall 142. The bottom wall 142 has a screw hole 145A, 145C formed therein. In the present embodiment, a plurality of (two) screw holes 145A and 145C are formed. The screw hole 145A and the screw hole 145C are arranged side by side along the direction in which the groove 141 extends. The cutting tool 1 is secured in the groove 141 of the turret 140 using a first securing member 150, a second securing member 160, and screws 169A, 169C.

Specifically, the first securing member 150 has a shape that includes a pair of end surfaces 155 of a trapezoidal shape, and a top surface 151, a bottom surface 152, a first side surface 153, and a second side surface 154 of a rectangular shape arranged perpendicular to the pair of end surfaces 155 to connect between the pair of end surfaces 155. Of the parallel sides of an end surface 155 having a trapezoidal shape, the side connected to the top surface 151 is shorter in length than the side connected to the bottom surface 152. The second securing member 160 has a shape that includes a pair of end surfaces 165 of a trapezoidal shape, and a top surface 161, a bottom surface 162, a first side surface 163, and a second side surface 164 of a rectangular shape arranged perpendicular to the pair of end surfaces 165 to connect between the pair of end surfaces 165. Of the parallel sides of an end surface 165 having a trapezoidal shape, the side connected to the top surface 161 is longer in length than the side connected to the bottom surface 162. The second securing member 160 has screw holes 165A, 165B, and 165C formed to penetrate from the top surface 161 to the bottom surface 162. The screw hole 165A and the screw hole 165C are arranged side by side to correspond to the screw hole 145A and the screw hole 145C.

Referring to FIGS. 7 and 8, the first securing member 150 is arranged such that the bottom surface 152 contacts the bottom wall 142 of the turret 140 and the first side surface 153 contacts a side wall 143 of the turret 140. The cutting tool 1 is arranged such that the third surface 13 contacts the bottom wall 142 of the turret 140 and the second surface 12 contacts the other side wall 143 of the turret 140. The second securing member 160 is arranged such that the first side surface 163 contacts the second side surface 154 of the first securing member 150 and the second side surface 164 contacts the fourth surface 14 of the cutting tool 1. The second securing member 160 is arranged such that the bottom surface 162 faces the bottom wall 142 of the turret 140. Then, the screw 169A and the screw 169C are arranged so as to penetrate respectively through the screw hole 165A and the screw hole 165C of the second securing member 160 to be inserted into the screw hole 145A and the screw hole 145C of the turret. A screw 169B is inserted into the screw hole 165B of the second securing member 160. Tightening the screw 169A and the screw 169C decreases the distance between the bottom surface 162 of the second securing member 160 and the bottom wall 142 of the turret 140. The second securing member 160 functions as a shim in this manner, so that the cutting tool 1 is firmly secured to the turret 140. On the other hand, for removing the cutting tool 1 from the turret 140, the screw 169B is screwed into the screw hole 165B. The screw 169B penetrates through the screw hole 165B and has its tip end coming into contact with the bottom wall 142. Further screwing down the screw 169B makes the second securing member 160 move relative to the turret 140 so as to increase the distance between the bottom surface 162 and the bottom wall 142. This facilitates removal of the second securing member 160. When the second securing member 160 is removed, the securing of the cutting tool 1 to the turret 140 is released, allowing the cutting tool 1 to be easily removed from the turret 140.

Referring now to FIG. 8, the cutting tool 1 having the body portion 10 with a quadrangular cross section perpendicular to the longitudinal direction is held in a manner that, of the outer peripheral surfaces of the body portion 10 corresponding to the four sides of the quadrangle, three surfaces (second surface 12, third surface 13, and fourth surface 14) other than the first surface 11 corresponding to the side flank 90A of the cutting tip 90 are in contact with the turret 140 or the second securing member 160. Therefore, by arranging the first board 51 and the wireless communication unit 32 in the first recess 11E formed in the first surface 11 as the surface corresponding to the side flank 90A of the cutting tip 90, signals originated from the wireless communication unit 32 are transmitted to the outside without being interrupted by the turret 140. Further, the battery housing portion 11F as the space for housing the battery 61 is open at the first surface 11. This facilitates replacement of the battery 61 in the state where the cutting tool 1 is secured to the turret 140. It should be noted that in the case where the cutting tip 90 is attached systematically with a plane parallel to the first surface 11 or the third surface 13 of the body portion 10 of the cutting tool 1 as the plane of symmetry, the side flank 90A and the front flank 90B can be interchanged depending on the mode of use. In such a case, the first board 51 and the wireless communication unit 32 may be arranged in a recess that is formed in a surface, e.g. either the first surface 11 or the third surface 13, of the body portion 10 corresponding to the surface of the cutting tip 90 that can function as the side flank 90A (which can also function as the front flank 90B). In other words, in this case, the side flank of the cutting tip 90 means a surface that can function as a side flank.

(5) Advantageous Effects of Present Embodiment

Referring to FIG. 2, in the cutting tool 1 of the present embodiment, the first strain sensor 42 and the second strain sensor 45 are arranged on the first surface 11 and the second surface 12, respectively, of the body portion 10. This enables measurement of strain in two directions of the cutting tool 1 (body portion 10). Further, the first strain sensor 42 and the second strain sensor 45 are electrically connected to the first board 51 and the second board 52, respectively, which are connected to each other via the flexible cable 54, and the wireless communication unit 32 transmits signals containing information on the strain of the body portion 10 detected by the first strain sensor 42 and the second strain sensor 45 to the outside. By transmitting the signals containing the information on the strain of the body portion 10 detected by the first strain sensor 42 and the second strain sensor 45 using a common wireless communication unit 32, downsizing can be achieved as compared to the case where wireless communication units corresponding respectively to the first strain sensor 42 and the second strain sensor 45 are provided. Thus, the cutting tool 1 of the present embodiment can achieve downsizing while measuring the strain in two directions of the cutting tool 1.

In addition, in the present embodiment, the first recess 11E and the second recess 12E are formed in the first surface 11 and the second surface 12, respectively. The first strain sensor 42 and the first board 51 are arranged in the first recess 11E. The second strain sensor 45 and the second board 52 are arranged in the second recess 12E. As a result, the sensors and other components are suppressed from protruding to the outside and becoming an obstacle in the handling of the cutting tool 1.

Further, referring to FIGS. 1, 2, and 6, the cutting tool 1 of the present embodiment includes the first lid 71 and the second lid 72 covering the first recess 11E and the second recess 12E, respectively. The first strain sensor 42 and the second strain sensor 45 are arranged on the first bottom wall 111 and the third bottom wall 121, respectively. The first lid 71 and the second lid 72 are arranged on the second bottom wall 112 and the fourth bottom wall 122, respectively, and are received within the first recess 11E and the second recess 12E, respectively. With such a structure, the strain sensors 42 and 45 are protected by the lids 71 and 72, and the lids 71 and 72 are suppressed from becoming an obstacle in the handling of the cutting tool 1 (for example, securing the cutting tool 1 to a machine tool). In addition, in the case of bonding the lids 71 and 72 to the body portion 10, it is easy to bond the lids with a sufficient area.

Further, the present embodiment adopts the structure in which the first board 51 and the second board 52 are connected via the flexible cable 54 that passes through the first through hole 10D connecting the first surface 11 to the second surface 12. As a result, in the longitudinal direction of the body portion 10, the body portion 10 includes the columnar portion 10E that connects between both sides of the first through hole 10D so as to include the first surface 11 and the second surface 12. The presence of this columnar portion 10E facilitates imparting high rigidity to the cutting tool 1 (body portion 10).

In addition, in the present embodiment, the first strain sensor 42, the second strain sensor 45, and the acceleration sensor 29 are arranged closer to the first end 10A than the battery 61. Placing the first strain sensor 42, the second strain sensor 45, and the acceleration sensor 29 close to the first end 10A, which is the end on the side where the cutting tip 90 is mounted, increases the sensitivity in the detection of the strain and acceleration. On the other hand, the region of the body portion 10 where rigidity is decreased due to formation of the battery housing portion 11F is held by the turret 140, which suppresses the effect of reduction in rigidity of the cutting tool 1. Thus, the cutting tool 1 of the present embodiment achieves both the sensitivity of the sensors and the rigidity of the cutting tool while enabling monitoring of the state of the cutting tool 1 during machining.

Further, in the present embodiment, the acceleration sensor 29 is arranged closer to the first end 10A than the first strain sensor 42 and the second strain sensor 45. This allows the acceleration and strain to be detected with accuracy.

Furthermore, in the present embodiment, the first area of the first board 51 (where the connector 35 is arranged), the AD converter 31, and the wireless communication unit 32 are arranged in this order from the first end 10A side to the second end 10B side. This can decrease the length of the wiring pattern on the first board 51. As a result, the first board 51 can be reduced in size.

Embodiment 2

Figure 9:
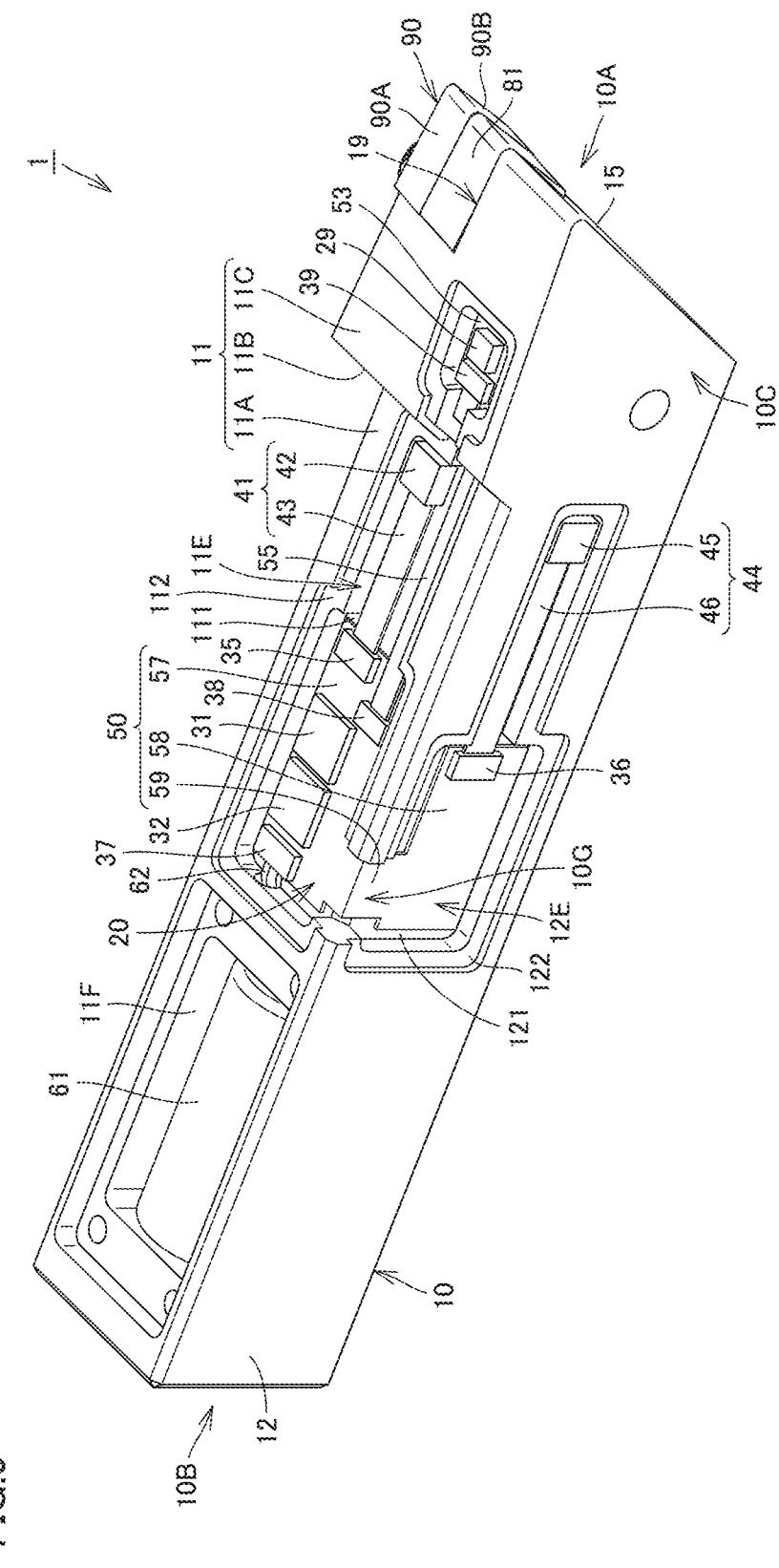
FIG. 9 is a schematic perspective view showing the structure of a cutting tool of Embodiment 2 with lids removed therefrom.

Another embodiment, Embodiment 2, will now be described. FIG. 9 is a schematic perspective view showing the structure of a cutting tool of Embodiment 2 with lids removed therefrom. FIG. 9 corresponds to FIG. 2 in Embodiment 1. Referring to FIGS. 9 and 2, the cutting tool 1 in Embodiment 2 basically has a similar structure and provides similar effects as the cutting tool 1 of Embodiment 1. However, the cutting tool 1 of Embodiment 2 differs from the cutting tool 1 of Embodiment 1 in terms of structure of the board module 50 and the body portion 10.

Referring to FIG. 9, the board module 50 of Embodiment 2 is composed of a single flexible board. The board module 50 includes a first portion 57 arranged in the first recess 11E, a second portion 58 arranged in the second recess 12E, and a connecting portion 59 electrically connecting the first portion 57 to the second portion 58. The first portion 57, the second portion 58, and the connecting portion 59 constitute the single flexible board. The body portion 10 has a notched portion 10G formed to connect the first recess 11E to the second recess 12E as a result of removal of the corner where the first surface 11 and the second surface 12 are connected. The connecting portion 59 is arranged on a bottom wall defining the notched portion 10G.

Referring to FIGS. 9 and 2, according to the cutting tool 1 of Embodiment 2, the number of components can be decreased (specifically, the connectors 33 and 34 can be omitted) as compared to the cutting tool 1 of Embodiment 1. In addition, according to the cutting tool 1 of Embodiment 2, attaching the board module 50 to the body portion 10 becomes easy as compared to the cutting tool 1 of Embodiment 1. As a result, the cutting tool 1 of Embodiment 2 can achieve downsizing of the board module 50, reduction of production cost, and the like.

Embodiment 3

Figure 10:
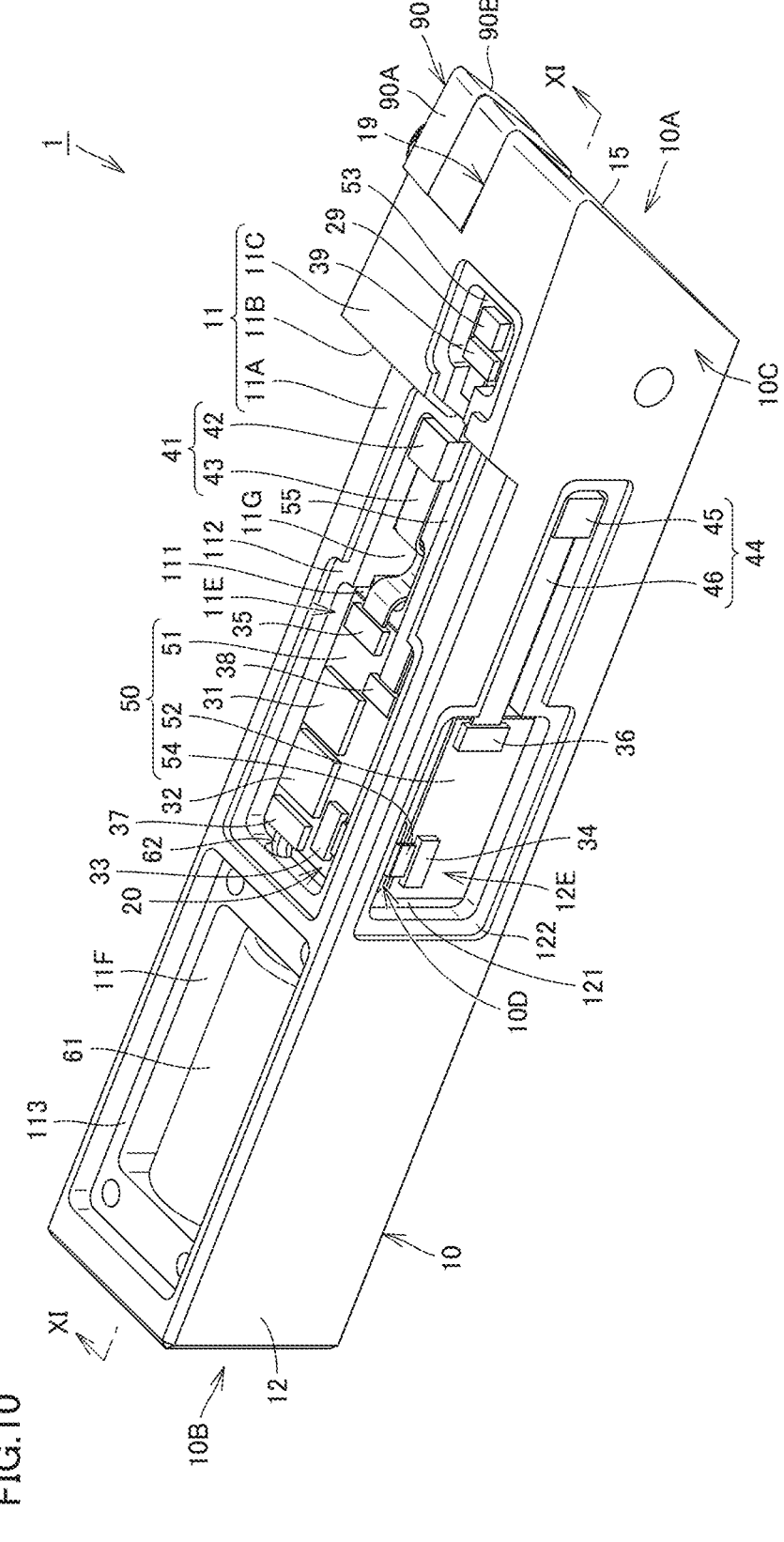
FIG. 10 is a schematic perspective view showing the structure of a cutting tool of Embodiment 3 with lids removed therefrom.
Figure 11:
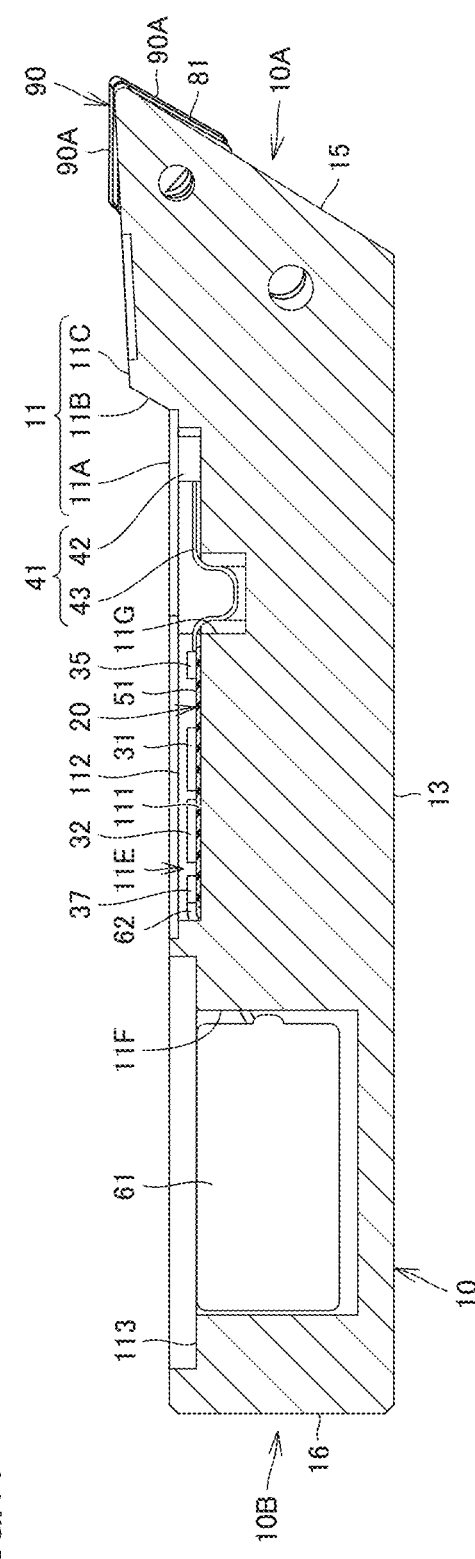
FIG. 11 is a schematic cross-sectional view along the line XI-XI in FIG. 10.

Yet another embodiment, Embodiment 3, will now be described. FIG. 10 is a schematic perspective view showing the structure of a cutting tool of Embodiment 3 with lids removed therefrom. FIG. 11 is a schematic cross-sectional view along the line XI-XI in FIG. 10. FIG. 10 corresponds to FIG. 2 in Embodiment 1. Referring to FIGS. 10 and 2, the cutting tool 1 of Embodiment 3 basically has a similar structure and provides similar effects as the cutting tool 1 of Embodiment 1. However, the cutting tool 1 of Embodiment 3 differs from the cutting tool 1 of Embodiment 1 in terms of manner of connecting the first strain sensor 42 to the connector 35 with the wiring 43 constituting the first strain sensor component 41.

Referring to FIGS. 10 and 11, in the first recess 11E of the body portion 10 of Embodiment 3, a third recess 11G is formed. The wiring 43 connects the first strain sensor 42 to the connector 35 on the first board 51 with slack. The portion of the wiring 43 corresponding to the slack is housed in the third recess 11G.

In the cutting tool 1 of Embodiment 3, the slack in the wiring 43 facilitates disposing the first strain sensor 42, without the need to adjust the length of the wiring 43.

Embodiment 4

Figure 12:
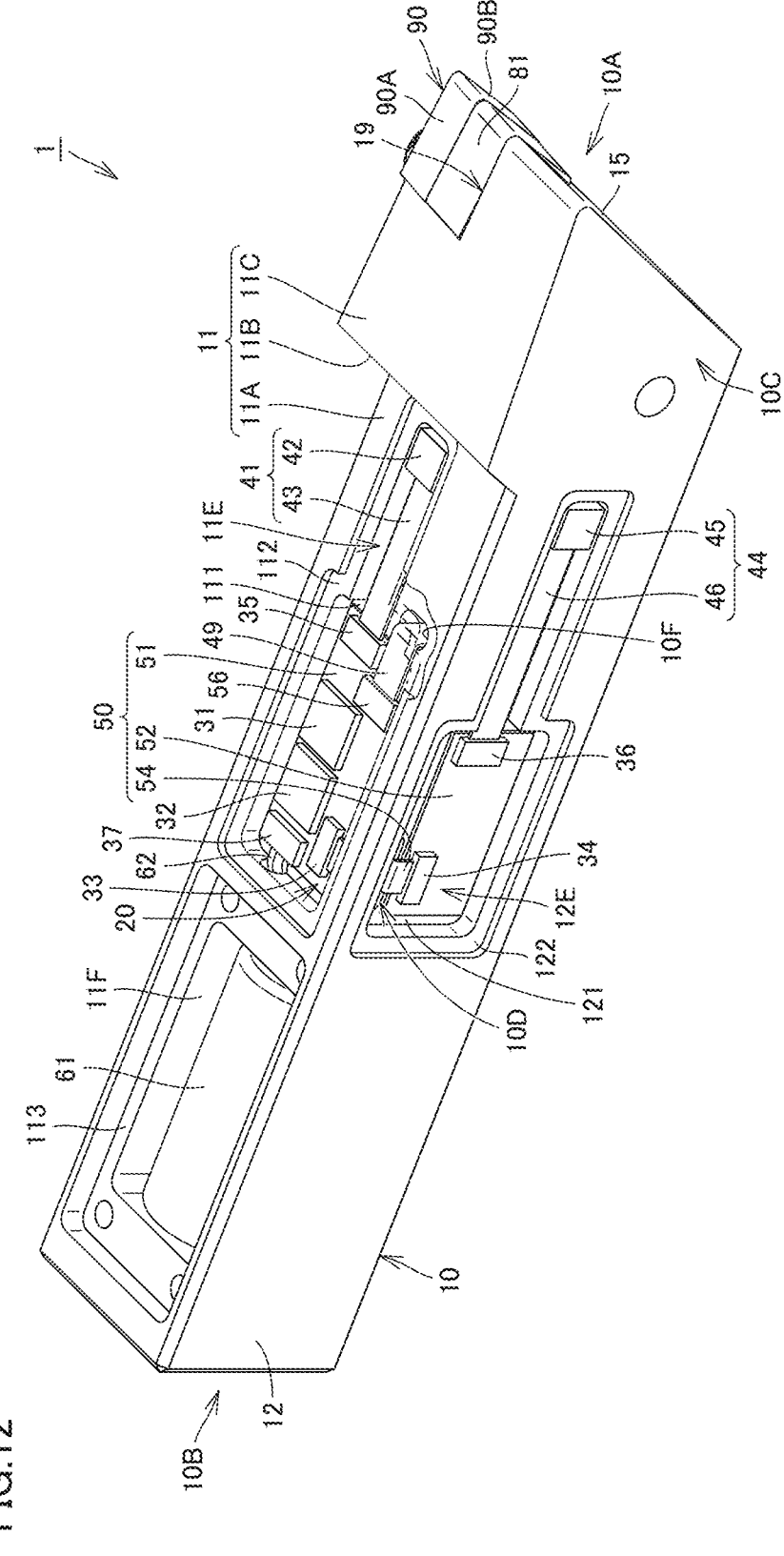
FIG. 12 is a schematic perspective view showing the structure of a cutting tool of Embodiment 4 with lids removed therefrom.
Figure 13:
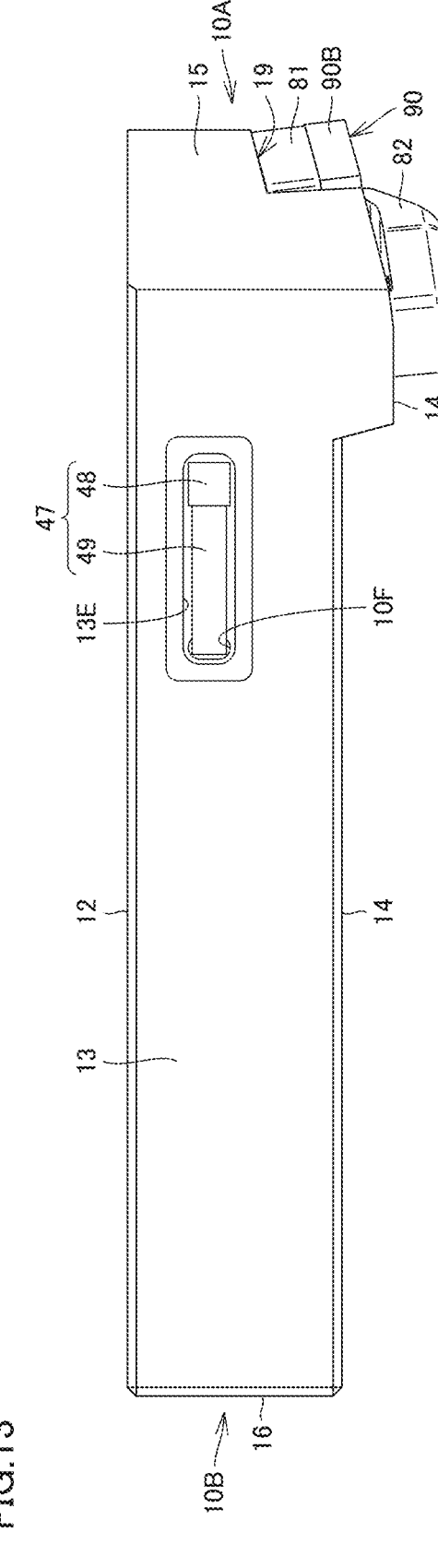
FIG. 13 is a schematic plan view showing the structure of the cutting tool of Embodiment 4 with a lid removed therefrom.

Yet another embodiment, Embodiment 4, will now be described. FIG. 12 is a schematic perspective view showing the structure of a cutting tool of Embodiment 4 with lids removed therefrom. FIG. 13 is a schematic plan view showing the structure of the cutting tool of Embodiment 4 with a lid removed therefrom. FIG. 12 corresponds to FIG. 2 in Embodiment 1. FIG. 13 is a schematic plan view of the cutting tool 1 as viewed in a direction perpendicular to the third surface 13.

Referring to FIGS. 12 and 2, the cutting tool 1 of Embodiment 4 basically has a similar structure and provides similar effects as the cutting tool 1 of Embodiment 1. However, the cutting tool 1 of Embodiment 4 differs from the cutting tool 1 of Embodiment 1 in terms of arrangement and connection state of the sensors.

Referring to FIGS. 12, 13, and 2, in the cutting tool 1 of Embodiment 4, a third strain sensor 48 is added while the acceleration sensor 29 in the cutting tool 1 of Embodiment 1 is omitted. Specifically, as shown in FIG. 13, the third surface 13 of the body portion 10 of Embodiment 4 has a fourth recess 13E formed therein. The body portion 10 has a second through hole 10F formed to connect the fourth recess 13E to the first recess 11E. It should be noted that FIG. 12 shows the state where a part of the body portion 10 is removed for the purpose of making the second through hole 10F visible. The third strain sensor 48 has wiring 49 as third wiring connected thereto. The third strain sensor 48 and the wiring 49 constitute a third strain sensor component 47. That is, the sensor unit 20 in Embodiment 4 includes the third strain sensor component 47. The wiring 49 connects the third strain sensor 48 to a connector 56 mounted on the first board 51 through the second through hole 10F. It should be noted that the second through hole 10F may connect the fourth recess 13E to the second recess 12E. In this case, the wiring 49 may connect the third strain sensor 48 to the second board 52 through the second through hole 10F.

In the cutting tool 1 of Embodiment 4, the third strain sensor 48 is arranged on the third surface 13, with no board disposed on the third surface 13. This can reduce the size of the fourth recess 13E formed in the third surface 13. As a result, the reduction of rigidity of the cutting tool 1 (body portion 10) can be suppressed. Referring to FIG. 13, the cutting tool 1 of Embodiment 4 may include a fourth lid (not shown) covering the fourth recess 13E. The fourth lid is preferably received within the fourth recess 13E, as are the first to third lids 71 to 73 described above.

Embodiment 5

Figure 14:
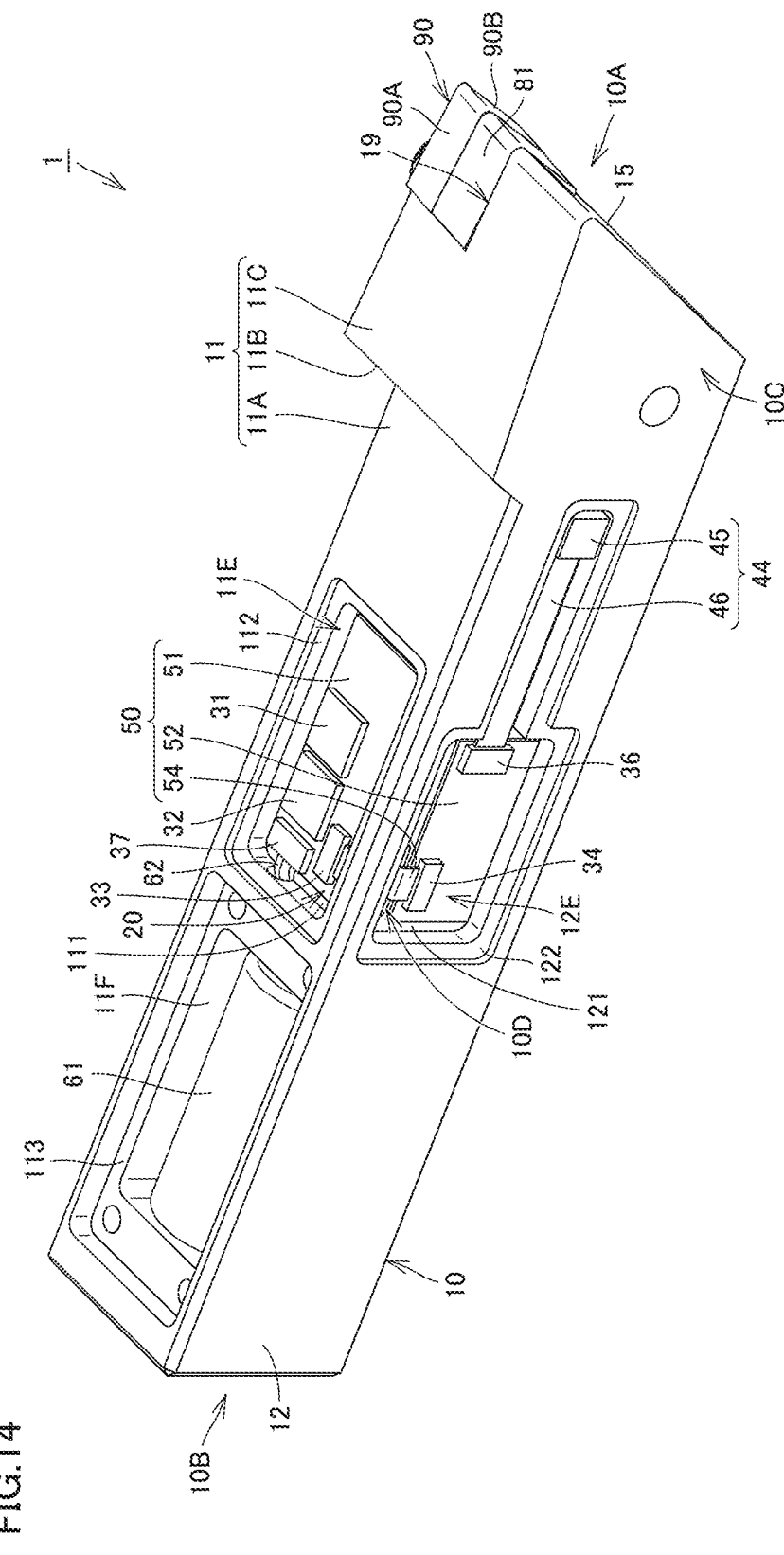
FIG. 14 is a schematic perspective view showing the structure of a cutting tool of Embodiment 5 with lids removed therefrom.

Yet another embodiment, Embodiment 5, will now be described. FIG. 14 is a schematic perspective view showing the structure of a cutting tool of Embodiment 5 with lids removed therefrom. FIG. 14 corresponds to FIG. 2 in Embodiment 1.

Referring to FIGS. 14 and 2, the cutting tool 1 of Embodiment 5 basically has a similar structure and provides similar effects as the cutting tool 1 of Embodiment 1. However, the cutting tool 1 of Embodiment 5 differs from the cutting tool 1 of Embodiment 1 in terms of arrangement of the sensors.

Referring to FIG. 14, in the cutting tool 1 of Embodiment 5, the acceleration sensor 29 and the first strain sensor 42 in the cutting tool 1 of Embodiment 1 are omitted. The cutting tool 1 of Embodiment 5 includes only one strain sensor (second strain sensor 45). The wireless communication unit 32 transmits a signal containing information on the strain of the body portion 10 detected by the second strain sensor 45 to the outside. Further, in the cutting tool 1 of the present embodiment, the board module 50 includes the first board 51 arranged on the first surface 11 and the second board 52 arranged on the second surface 12. The first board 51 and the second board 52 are connected via the flexible cable 54 which is the connecting portion. The board module 50 is thus divided and arranged on different surfaces of the body portion 10, leading to an increased degree of freedom in the location for positioning the board module 50. As a result, it is easy to maintain the ease of the handling of the cutting tool 1. Thus, the cutting tool 1 of the present embodiment is a cutting tool that enables monitoring of the state of the cutting tool during machining, while maintaining the ease of handling.

Embodiment 6

Figure 15:
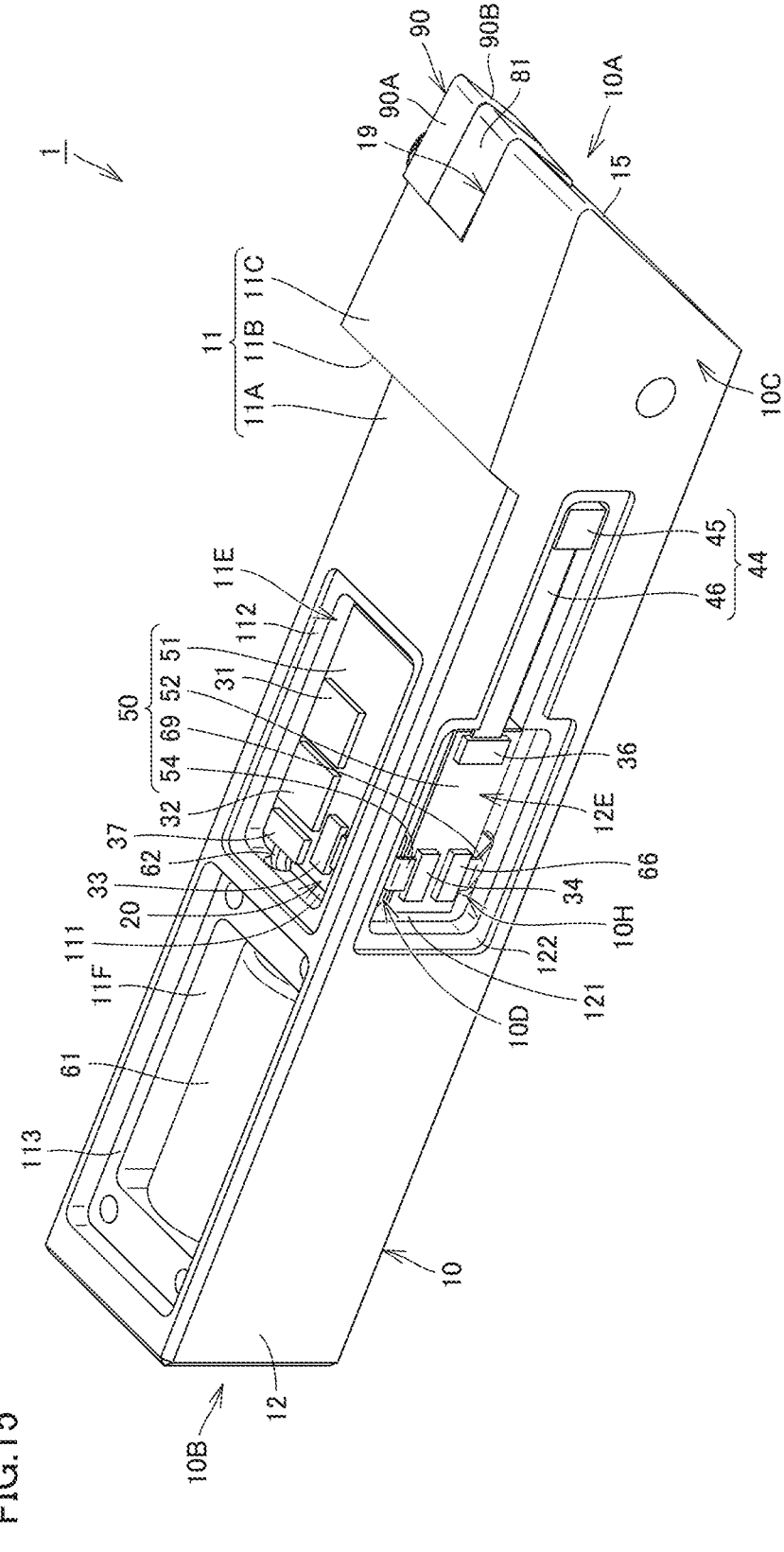
FIG. 15 is a schematic perspective view showing the structure of a cutting tool of Embodiment 6 with lids removed therefrom.
Figure 16:
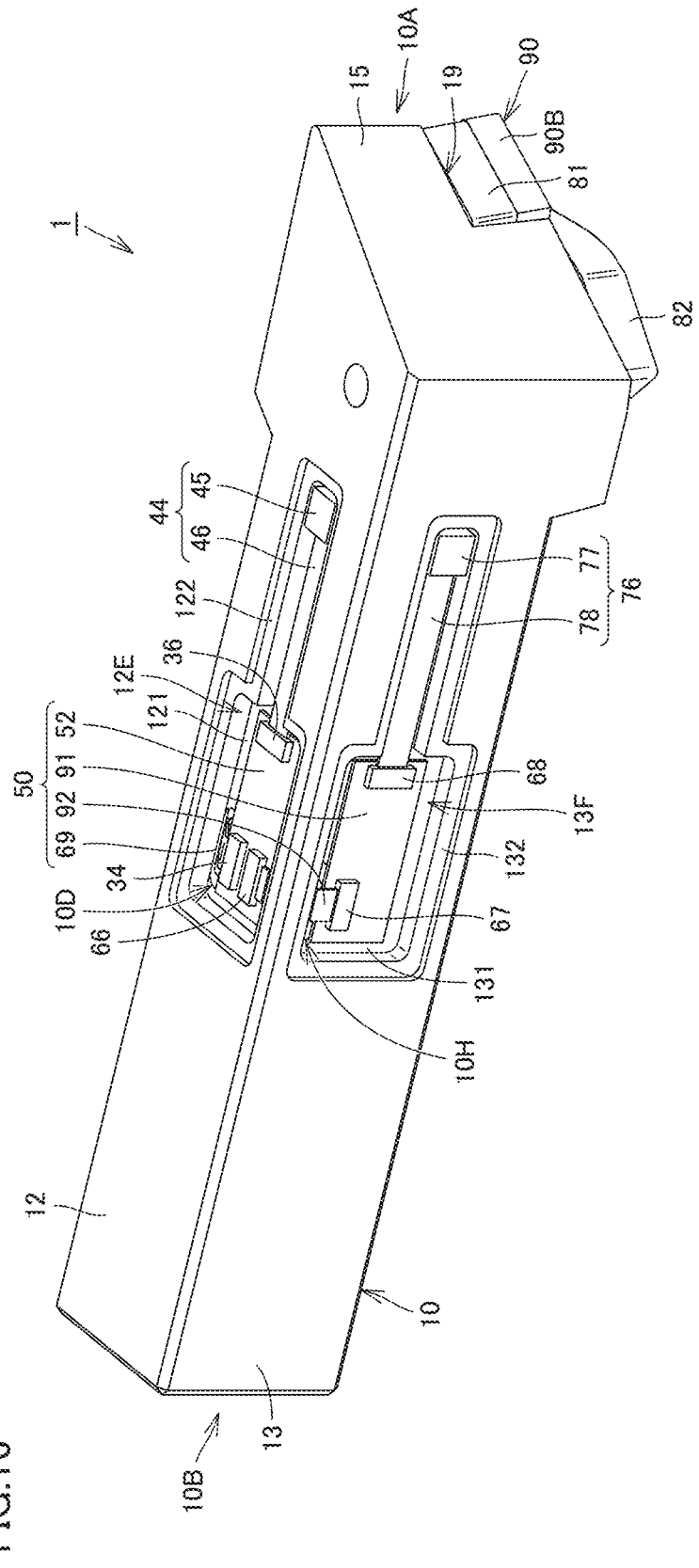
FIG. 16 is a schematic perspective view of the cutting tool of Embodiment 6 as seen in a different viewpoint from that of FIG. 15.

Still yet another embodiment, Embodiment 6, will now be described. FIG. 15 is a schematic perspective view showing the structure of a cutting tool of Embodiment 6 with lids removed therefrom. FIG. 15 corresponds to FIG. 14 in Embodiment 5. FIG. 16 is a schematic perspective view of the cutting tool of Embodiment 6 as seen in a different viewpoint from that of FIG. 15.

Referring to FIGS. 15, 16, and 14, the cutting tool 1 of Embodiment 6 basically has a similar structure and provides similar effects as the cutting tool 1 of Embodiment 5. However, the cutting tool 1 of Embodiment 6 differs from the cutting tool 1 of Embodiment 5 in terms of arrangement of the sensors.

Referring to FIGS. 15 and 16, in the cutting tool 1 of Embodiment 6, a fourth strain sensor 77 is added to the cutting tool 1 of Embodiment 5. That is, the cutting tool 1 of Embodiment 6 includes two strain sensors.

Referring to FIG. 16, the third surface 13 has a fifth recess 13F formed therein. In the fifth recess 13F, a fourth board 91 is arranged. The fourth board 91, as with the first board 51 and the like, includes a board body made of an insulator such as resin, and a circuit pattern (not shown) made of an electrical conductor such as copper formed on a surface of the board body. The second recess 12E and the fifth recess 13F are connected via a third through hole 10H.

The second board 52 and the fourth board 91 are electrically connected via a flexible cable 92. The fourth board 91 and the flexible cable 92 constitute the board module 50. The fourth board 91 is a third portion of the board module 50. The flexible cable 92 is a connecting portion of the board module 50. For the connecting portion, a flexible board may be adopted instead of the flexible cable 92. The flexible cable 92 passes through the third through hole 10H to electrically connect the second board 52 to the fourth board 91. For the connecting portion, a cable or a board other than the flexible cable and the flexible board may be adopted.

The fourth strain sensor 77 is arranged on the third surface 13. The fourth strain sensor 77 is arranged in the fifth recess 13F located in the first surface 13. The fourth strain sensor 77 has wiring 78 connected thereto. The fourth strain sensor 77 and the wiring 78 constitute a fourth strain sensor component 76. On the second board 52 (on the circuit pattern of the second board 52), a connector 66 is mounted in addition to the case of Embodiment 5. On the fourth board 91 (on the circuit pattern of the fourth board 91), connectors 67 and 68 are mounted. The wiring 78 is connected to the connector 68. With this, the fourth strain sensor 77 is electrically connected to the fourth board 91. The connector 66 and the connector 67 are connected via the flexible cable 92. With this, the second board 52 and the fourth board 91 are electrically connected to each other. The second board 52 and the fourth board 91 arranged on the surface of the body portion 10 as well as the connectors 66 to 68 mounted on the boards, and the fourth strain sensor component 76 constitute the sensor unit 20.

Referring to FIG. 16, the cutting tool 1 of Embodiment 6 may include a fifth lid (not shown) covering the fifth recess 13F. The fifth lid is preferably received within the fifth recess 13F, as are the first to third lids 71 to 73 described above. The body portion 10 includes a sixth bottom wall 131 and a seventh bottom wall 132. The sixth bottom wall 131 and the seventh bottom wall 132 constitute a wall surface defining the fifth recess 13F. The seventh bottom wall 132 has a smaller distance from an opening of the fifth recess 13F than the sixth bottom wall 131. As viewed in a depth direction of the fifth recess 13F, the seventh bottom wall 132 surrounds the sixth bottom wall 131. The fourth strain sensor 77 and the fourth board 91 are arranged on the sixth bottom wall 131. The fifth lid is arranged on the seventh bottom wall 132 and is preferably received within the fifth recess 13F. The fifth lid may be bonded to the body portion 10. Adopting the structure as in the present embodiment can achieve downsizing while measuring the strain in two directions of the cutting tool 1, as in the case of Embodiment 1.

(Variations)

In the above embodiments, the case where the acceleration sensor 29 is arranged on the first surface 11 (Embodiments 1 to 3) and the case where no acceleration sensor 29 is adopted (Embodiment 4) have been described. However, the acceleration sensor 29 may be arranged on at least one of the second surface 12, the third surface 13, and the fourth surface 14, besides the first surface 11, and may be arranged on all the surfaces. In the above embodiments, the case where the strain sensor is arranged only on the second surface (Embodiment 5), the case where the strain sensors are disposed on the first surface 11 and the second surface 12 (Embodiments 1 to 3), the case where the strain sensors are arranged on the second surface and the third surface (Embodiment 6), and the case where the strain sensors are disposed on the first surface 11 through the third surface 13 (Embodiment 4) have been described. However, the strain sensor may be disposed also on the fourth surface 14. That is, the strain sensor only needs to be arranged on at least one of the first through fourth surfaces, and may be arranged on all the surfaces. Further, the board constituting the board module (the first portion and the like) only needs to be arranged on at least one of the first through fourth surfaces, and may be arranged on all the surfaces. In the above embodiments, the case where the board module is arranged on two or more of the first through fourth surfaces has been described. However, the board module may be arranged on only one of the first through fourth surfaces. These sensor arrangement and board module configuration may be combined arbitrarily. For example, one board (first portion or the like) constituting the board module and one strain sensor may be arranged on three surfaces out of the first through fourth surfaces, or may be arranged on the four surfaces (all the surfaces). For example, one board (first portion or the like) constituting the board module and one strain sensor may be arranged on three surfaces out of the first through fourth surfaces, or may be arranged on the four surfaces (all the surfaces). Further, the recesses such as the first recess 11E, the second recess 12E, the third recess 11G, the fourth recess 13E, and the fifth recess 13F formed in the surface of the body portion 10 may be filled with a filler (e.g., filler made of resin). Even in the case where the recesses are filled with the filler or the case where the lids are provided to cover the recesses, the wall surfaces such as the bottom and side walls defining the recesses constitute the surface of the body portion 10.

Further, in the cutting tool 1 of the above embodiments, a light emitting device, such as a light emitting diode, may be disposed in the first recess 11E, the second recess 12E, or other recess formed in the surface of the body portion 10 to indicate the state of operation of the cutting tool 1. This light emitting device may emit light when the power of the sensor unit 20 of the cutting tool is on, for example. This light emitting device emits visible light. In this case, the lids such as the first lid 71 and the second lid 72 covering the recesses have translucency to the light from the light emitting device. The first lid 71, the second lid 72, and other lids covering the recesses may be transparent to visible light. The light emitting device may be arranged in a recess that is different from the recesses in which the sensor unit 20 is housed. This recess may be molded with a resin or other material having translucency to the light from the light emitting device.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: cutting tool; 10: body portion; 10A: first end; 10B: second end; 10D: first through hole; 10E: columnar portion; 10F: second through hole; 10G: notched portion; 10H: third through hole; 11: first surface; 11A: first region; 11B: second region; 11C: third region; 11E: first recess; 11F: battery housing portion; 11G: third recess; 12: second surface; 12E: second recess; 13: third surface; 13E: fourth recess; 13F: fifth recess; 14: fourth surface; 15: fifth surface; 16: sixth surface; 19: holding portion; 20: sensor unit; 29: acceleration sensor; 31: AD converter; 32: wireless communication unit; 33 to 39: connector; 41: first strain sensor component; 42: first strain sensor; 43: wiring; 44: second strain sensor component; 45: second strain sensor; 46: wiring; 47: third strain sensor component; 48: third strain sensor; 49: wiring; 50: board module; 51: first board; 52: second board; 53: third board; 54: flexible cable; 55: wiring; 56: connector; 57: first portion; 58: second portion; 59: connecting portion; 61: battery; 62: wiring; 66 to 68: connector; 71: first lid; 72: second lid; 73: third lid; 76: fourth strain sensor component; 77: fourth strain sensor; 78: wiring; 81: soleplate; 82: securing portion; 90: cutting tip; 90A: side flank; 90B: front flank; 91: fourth board; 92: flexible cable; 111: first bottom wall; 112: second bottom wall; 113: fifth bottom wall; 121: third bottom wall; 122: fourth bottom wall; 131: sixth bottom wall; 132: seventh bottom wall; 140: turret; 141: groove; 142: bottom wall; 143: side wall; 145A, 145C: screw hole; 150: first securing member; 151: top surface; 152: bottom surface; 153: first side surface; 154: second side surface; 155: end surface; 160: second securing member; 161: top surface; 162: bottom surface; 163: first side surface; 164: second side surface; 165: end surface; 165A, 165B, 165C: screw hole; and 169A, 169B, 169C: screw hole.

The invention claimed is:

1. A cutting tool for cutting a workpiece by contacting the workpiece that is rotating, the cutting tool comprising:
    a body portion having a bar shape extending from a first end, which is an end on a side where a cutting tip for cutting the workpiece is placed, to a second end, which is an end opposite to the first end; and
    a sensor unit arranged on a surface of the body portion, the sensor unit including
    a first sensor arranged on the surface of the body portion to detect a first physical quantity of the body portion,
    a board arranged on the surface of the body portion and electrically connected to the first sensor,
    a wireless communication unit mounted on the board and transmitting a signal containing information on the first physical quantity detected by the first sensor to an outside, and
    a battery arranged in the body portion and electrically connected to the board,
    the first sensor being arranged closer to the first end than the battery is to the first end.

2. The cutting tool according to claim 1, wherein as viewed from the board, the first sensor is arranged on the first end side and the battery is arranged on the second end side.

3. The cutting tool according to claim 1, wherein the sensor unit further includes a second sensor arranged on the surface of the body portion to detect a second physical quantity of the body portion.

4. The cutting tool according to claim 3, wherein
    the first physical quantity is strain, and
    the second physical quantity is at least one of acceleration and temperature.

5. The cutting tool according to claim 4, wherein the second sensor is arranged closer to the first end than the first sensor.

6. The cutting tool according to claim 1, wherein the sensor unit further includes an AD converter that is arranged on the board and converts an analog signal containing the information on the first physical quantity detected by the first sensor into a digital signal for transmission to the wireless communication unit.

7. The cutting tool according to claim 1, wherein
    the body portion has a quadrangular shape in a cross section perpendicular to a longitudinal direction,
    a first recess is formed in a first surface, which is an outer peripheral surface of the body portion corresponding to one of four sides of the quadrangle,
    the board and the wireless communication unit are arranged in the first recess, and
    the first surface is a surface, among the outer peripheral surfaces of the body portion corresponding to the respective sides of the quadrangle, that corresponds to a lateral flank of the cutting tip.

8. The cutting tool according to claim 7, wherein a space in the body portion housing the battery is open at the first surface.

9. The cutting tool according to claim 7, further comprising a lid covering the first recess.

10. The cutting tool according to claim 1, wherein
    the sensor unit further includes
    battery wiring that connects the battery to the board, and
    first sensor wiring that connects the first sensor to the board, and
    a first area, which is a region of the board to which the first sensor wiring is connected, is located closer to the first end than a second area, which is a region of the board to which the battery wiring is connected.

11. A cutting tool for cutting a workpiece by contacting the workpiece that is rotating, the cutting tool comprising:
    a body portion having a bar shape extending from a first end, which is an end on a side where a cutting tip for cutting the workpiece is placed, to a second end, which is an end opposite to the first end; and
    a sensor unit arranged on a surface of the body portion, the sensor unit including
    a first sensor arranged on the surface of the body portion to detect strain of the body portion,
    a board arranged on the surface of the body portion and electrically connected to the first sensor,
    a wireless communication unit mounted on the board and transmitting a signal containing information on the strain detected by the first sensor to an outside,
    a battery arranged in the body portion and electrically connected to the board, and
    a second sensor arranged on the surface of the body portion to detect at least one of acceleration and temperature of the body portion,
    wherein the first sensor is arranged closer to the first end than the battery, and
    wherein the second sensor is arranged closer to the first end than the first sensor.

12. A cutting tool for cutting a workpiece by contacting the workpiece that is rotating, the cutting tool comprising:
    a body portion having a bar shape extending from a first end, which is an end on a side where a cutting tip for cutting the workpiece is placed, to a second end, which is an end opposite to the first end; and
    a sensor unit arranged on a surface of the body portion, the sensor unit including
    a first sensor arranged on the surface of the body portion to detect a first physical quantity of the body portion,
    a board arranged on the surface of the body portion and electrically connected to the first sensor, a wireless communication unit mounted on the board and transmitting a signal containing information on the first physical quantity detected by the first sensor to an outside, and a battery arranged in the body portion and electrically connected to the board, the first sensor being arranged closer to the first end than the battery, wherein the body portion has a quadrangular shape in a cross section perpendicular to a longitudinal direction, wherein a first recess is formed in a first surface, which is an outer peripheral surface of the body portion corresponding to one of four sides of the quadrangle, wherein the board and the wireless communication unit are arranged in the first recess, wherein the first surface is a surface, among the outer peripheral surfaces of the body portion corresponding to the respective sides of the quadrangle, that corresponds to a lateral flank of the cutting tip, and wherein a space in the body portion housing the battery is open at the first surface.

* * * * *